United States Patent
Harasawa et al.

(10) Patent No.: US 10,466,908 B2
(45) Date of Patent: Nov. 5, 2019

(54) MEMORY SYSTEM THAT BUFFERS DATA BEFORE WRITING TO NONVOLATILE MEMORY

(71) Applicant: Toshiba Memory Corporation, Tokyo (JP)

(72) Inventors: Akinori Harasawa, Tokyo (JP); Yoshihisa Kojima, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 62 days.

(21) Appl. No.: 15/231,556

(22) Filed: Aug. 8, 2016

(65) Prior Publication Data
US 2017/0060439 A1 Mar. 2, 2017

Related U.S. Application Data

(60) Provisional application No. 62/209,637, filed on Aug. 25, 2015.

(51) Int. Cl.
G06F 3/06 (2006.01)
G06F 12/0893 (2016.01)
G06F 12/02 (2006.01)

(52) U.S. Cl.
CPC .......... *G06F 3/0611* (2013.01); *G06F 3/0656* (2013.01); *G06F 3/0679* (2013.01); *G06F 12/0893* (2013.01); *G06F 2212/1024* (2013.01); *G06F 2212/2022* (2013.01)

(58) Field of Classification Search
CPC .. G06F 3/0656; G06F 3/0679; G06F 12/0246; G06F 12/0893; G06F 2212/1024; G06F 2212/2022; G06F 2212/7201; G06F 2212/7203
See application file for complete search history.

(56) References Cited

U.S. PATENT DOCUMENTS

| | | | | |
|---|---|---|---|---|
| 6,645,835 B1 * | 11/2003 | Yamoto | ............. | H01L 21/02381 257/E21.102 |
| 2008/0028132 A1 | 1/2008 | Matsuura et al. | | |
| 2008/0049497 A1 * | 2/2008 | Mo | ..................... | G11C 11/5628 365/185.03 |
| 2008/0189485 A1 * | 8/2008 | Jung | ................... | G06F 12/0246 711/115 |
| 2009/0292862 A1 * | 11/2009 | Kitahara | ............. | G06F 12/0246 711/103 |
| 2010/0058003 A1 * | 3/2010 | Goto | ........................ | G11C 7/10 711/154 |
| 2011/0093659 A1 * | 4/2011 | Jo | ........................ | G06F 12/126 711/141 |

(Continued)

FOREIGN PATENT DOCUMENTS

JP H07006093 A 1/1995
JP 3550293 B2 8/2004

*Primary Examiner* — Nanci N Wong
(74) *Attorney, Agent, or Firm* — Kim & Stewart LLP

(57) ABSTRACT

A memory system includes a first buffer memory, a second buffer memory having a higher memory performance rating than the first buffer memory, a nonvolatile semiconductor memory unit including an array of memory cell regions, and a control unit configured to cause data to be buffered in one of the first and second buffer memories before the data are written in the nonvolatile semiconductor memory unit, according to characteristics of the data.

14 Claims, 7 Drawing Sheets

(56) References Cited

U.S. PATENT DOCUMENTS

| | | | |
|---|---|---|---|
| 2012/0246392 A1* | 9/2012 | Cheon | G06F 12/0871 |
| | | | 711/103 |
| 2012/0284587 A1* | 11/2012 | Yu | G06F 3/0608 |
| | | | 714/773 |
| 2013/0007352 A1* | 1/2013 | Maislos | G06F 12/0246 |
| | | | 711/103 |
| 2013/0141971 A1* | 6/2013 | Hosono | G11C 11/5628 |
| | | | 365/185.02 |
| 2014/0032820 A1* | 1/2014 | Harasawa | G06F 12/0246 |
| | | | 711/103 |
| 2014/0036930 A1* | 2/2014 | Lih | H04L 49/252 |
| | | | 370/429 |
| 2014/0281250 A1* | 9/2014 | Manohar | G06F 12/128 |
| | | | 711/133 |
| 2015/0113208 A1* | 4/2015 | Kakiki | G06F 12/0246 |
| | | | 711/103 |
| 2015/0248402 A1* | 9/2015 | Patterson, III | G06F 17/302 |
| | | | 707/640 |
| 2016/0048343 A1* | 2/2016 | Pekny | G11C 7/22 |
| | | | 711/103 |
| 2016/0283116 A1* | 9/2016 | Ramalingam | G06F 3/0602 |
| 2017/0010815 A1* | 1/2017 | Sprouse | G06F 3/0604 |

* cited by examiner

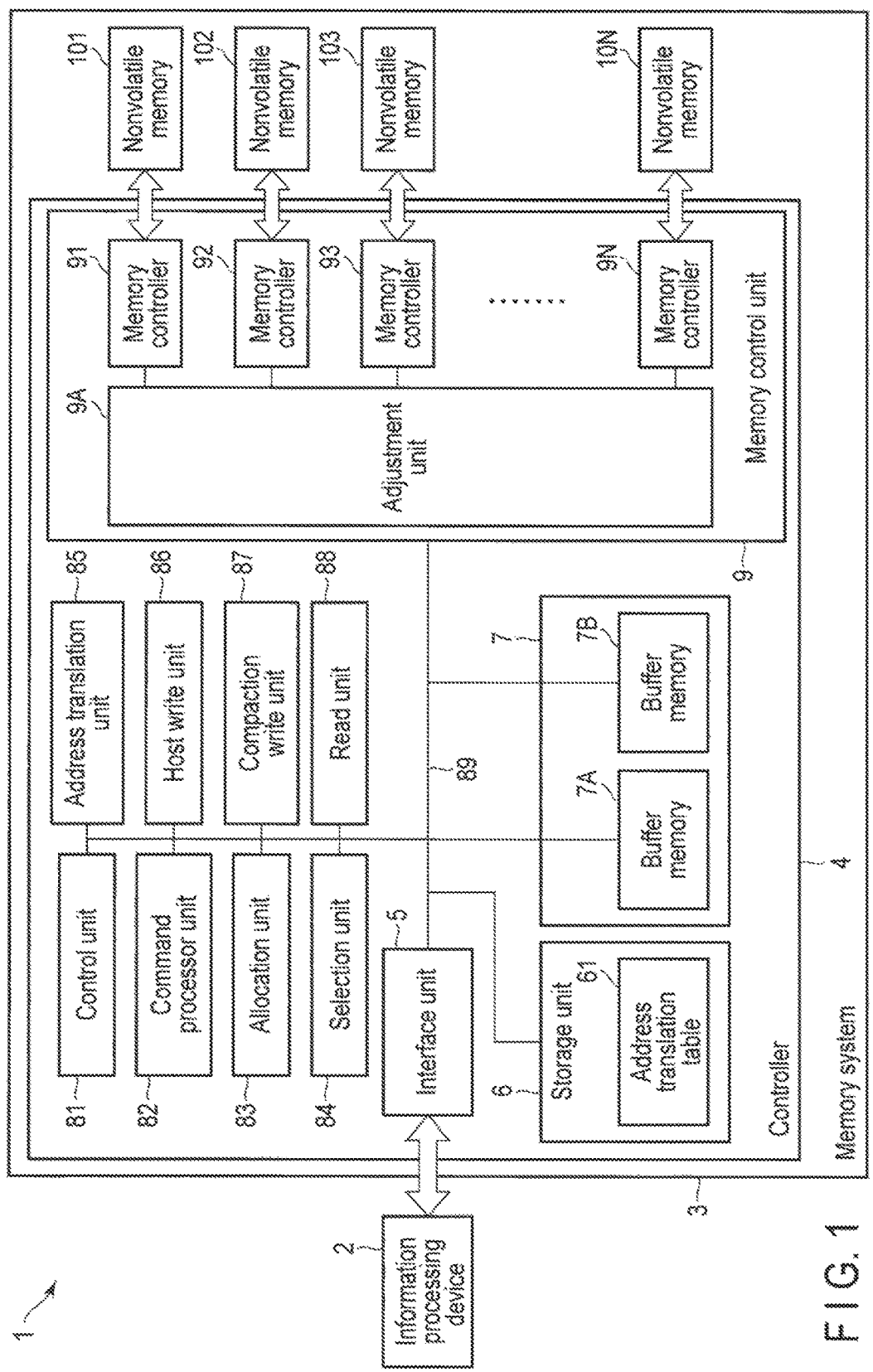
F I G. 1

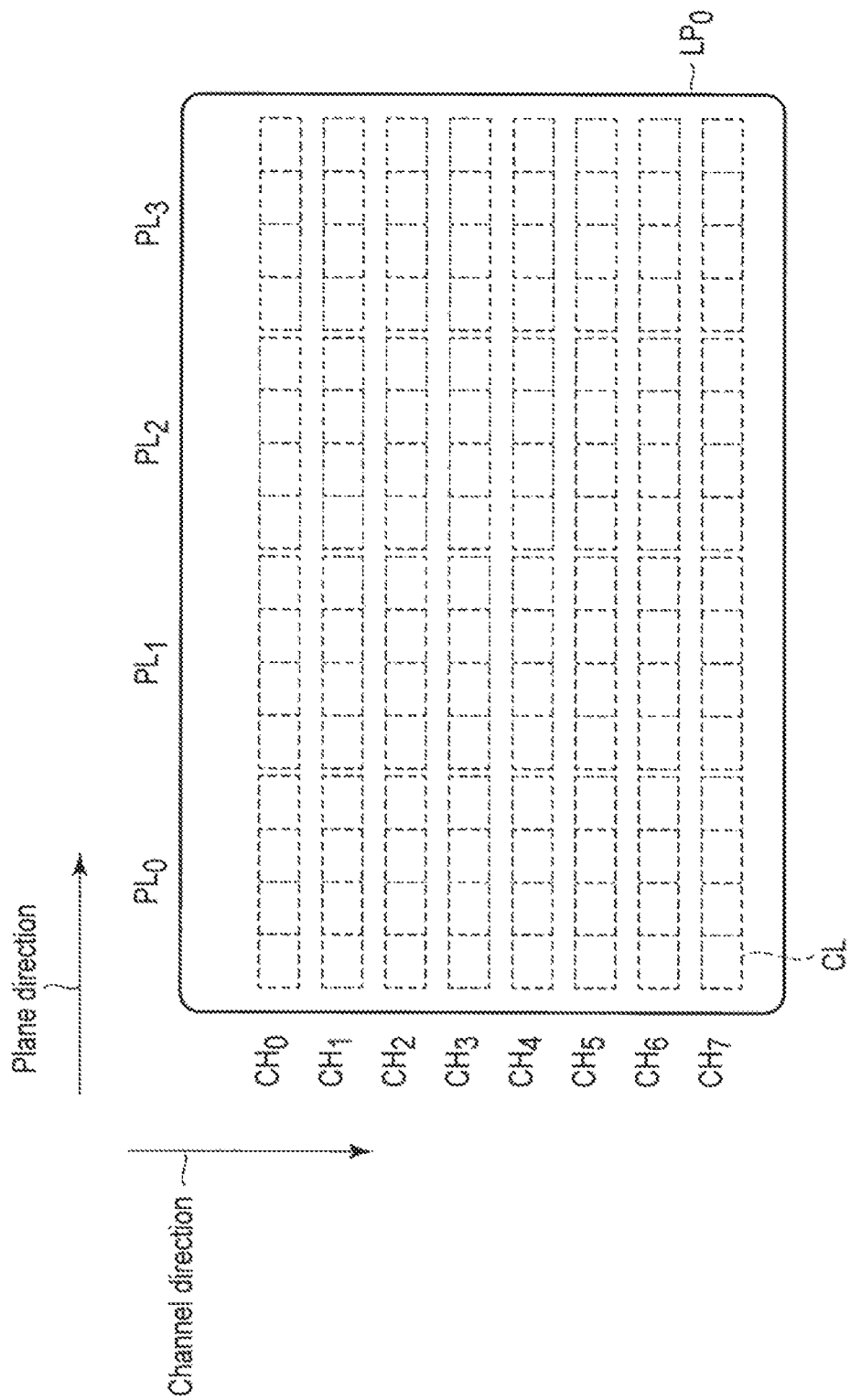
F I G. 2

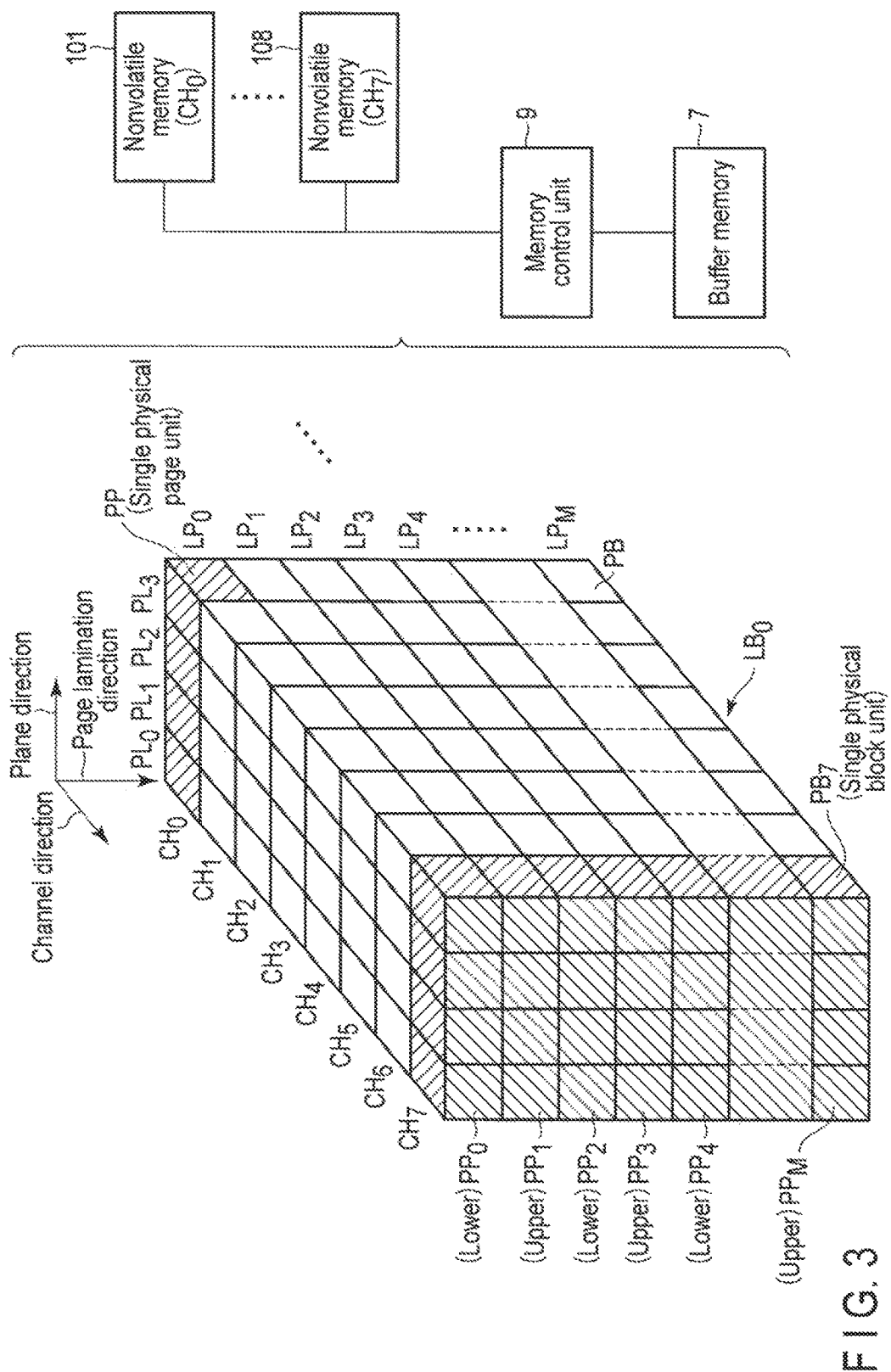
F I G. 3

| L[K] Data-In | L[K] Program | U[K-1] Data-In | U[K-1] Program | L[K+1] Data-In | L[K+1] Program | U[K] Data-In | U[K] Program |

F I G. 4

| L[K] Data-In | L[K] Program | L[K-1] Data-In | U[K-1] Data-In | U[K-1] Program | L[K+1] Data-In | L[K+1] Program | L[K] Data-In | U[K] Data-In | U[K] Program |

F I G. 5

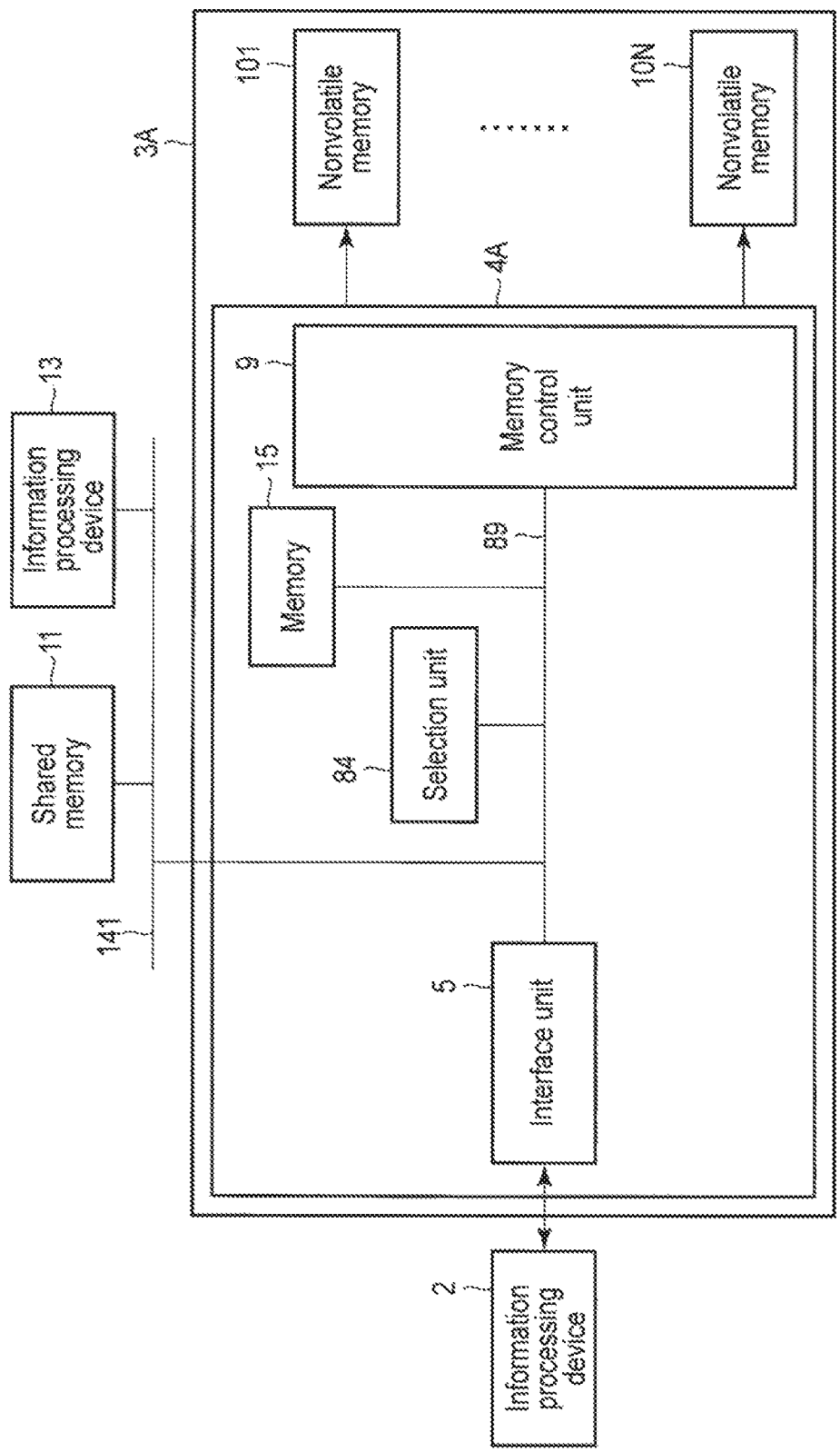
F I G. 8

MEMORY SYSTEM THAT BUFFERS DATA BEFORE WRITING TO NONVOLATILE MEMORY

CROSS-REFERENCE TO RELATED APPLICATION

This application is based upon and claims the benefit of priority from Provisional Application No. 62/209,637, filed Aug. 25, 2015, the entire contents of which are incorporated herein by reference.

FIELD

Embodiments described here relate generally to a memory system, in particular a memory system that buffers data before writing to nonvolatile memory.

BACKGROUND

A solid-state drive (SSD) includes, for example, nonvolatile memory such as NAND flash memory. The NAND flash memory includes a plurality of blocks (physical blocks). Each of the blocks includes a plurality of memory cells arranged at intersections of word lines and bit lines.

BRIEF DESCRIPTION OF THE DRAWING

FIG. 1 is a block diagram of a memory system according to a first embodiment.

FIG. 2 is a conceptual diagram of a logical page.

FIG. 3 is a conceptual diagram of a logical block.

FIG. 4 is a timing chart of lower/upper programming.

FIG. 5 is a timing chart of 2-bit upper programming.

FIG. 8 is a block diagram of a memory system according to a third embodiment.

DETAILED DESCRIPTION

Figure 6:
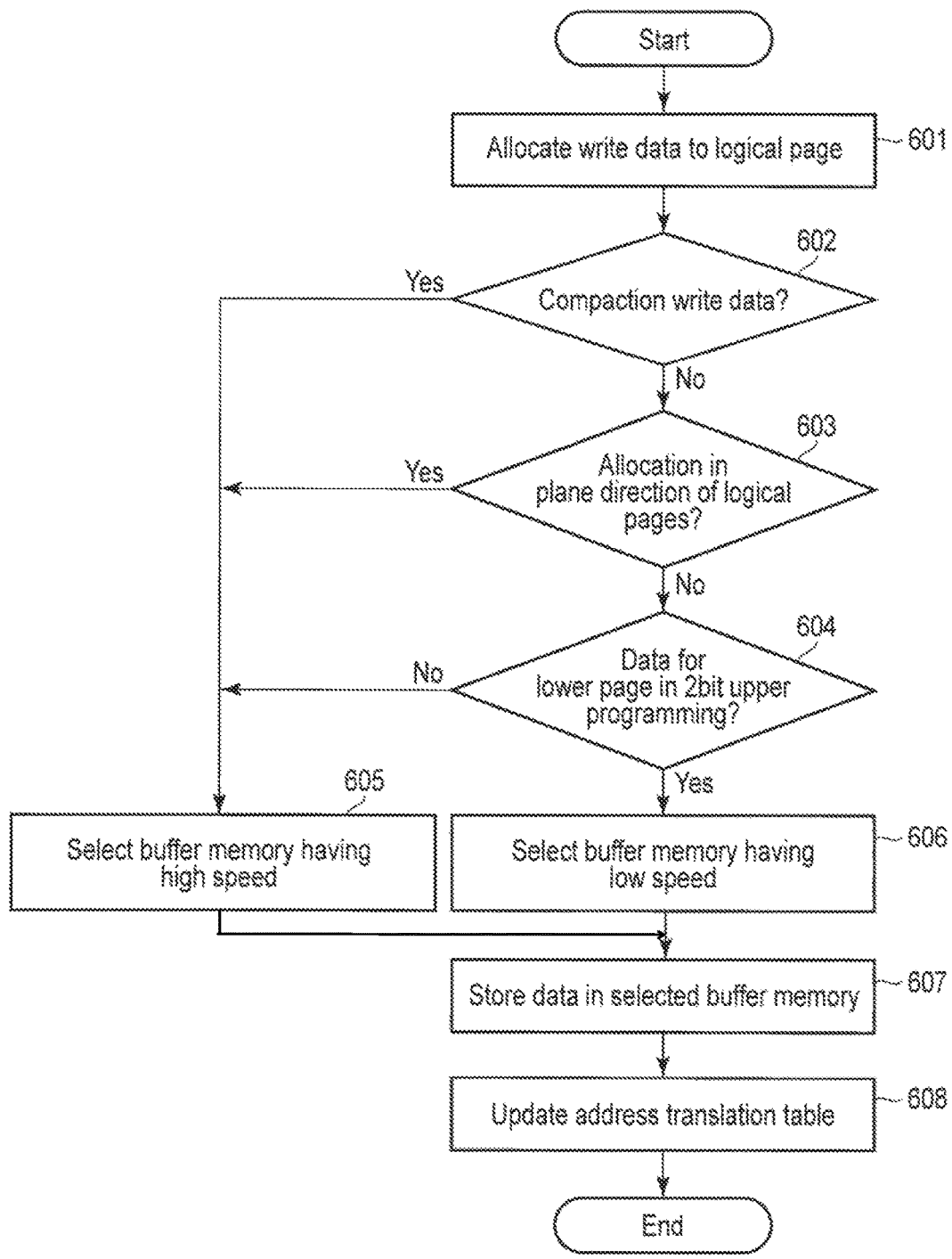
FIG. 6 is a flowchart of data storage processing with respect to the buffer memory by the memory system according to the first embodiment.

In general, according to an embodiment, a memory system includes a first buffer memory, a second buffer memory having a higher memory performance rating than the first buffer memory, a nonvolatile semiconductor memory unit including an array of memory cell regions, and a control unit configured to cause data to be buffered in one of the first and second buffer memories before the data are written in the nonvolatile semiconductor memory unit, according to characteristics of the data. Embodiments will be described with reference to the accompanying drawings. In the descriptions below, similar reference numbers denote elements similar in function and structure, and duplicate descriptions will be given only when necessary.

First Embodiment

According to a first embodiment, a memory system selects a buffer memory for storing write data based on a buffer-memory storage period.

In the first embodiment, the buffer-memory storage period corresponds to a period from a time at which write data is stored in a first buffer memory or a second buffer memory to a time at which the write data is written to a nonvolatile memory. In other words, the buffer-memory storage period corresponds to a length of time the write data is temporarily stored in the first buffer memory or the second buffer memory.

The memory system according to the first embodiment is a memory device such as, for example, an SSD. However, as the memory system according to the first embodiment, a memory device other than an SSD, for example, a memory card, a hard disk drive (HDD), a hybrid memory device or an optical disk, may be employed. If the memory system is an SSD, it has the same interface as an HDD.

The memory system includes a nonvolatile memory. In the first embodiment, the nonvolatile memory includes a NAND flash memory. However, the nonvolatile memory may include memory of another type, i.e., a flash memory other than the NAND flash memory, for example, a NOR flash memory, a magnetoresistive random access memory (MRAM), a phase change random access memory (PRAM), a resistive random access memory (ReRAM) or a ferroelectric random access memory (FeRAM).

In the nonvolatile memory, data is erased in units of an erase unit area, which includes a plurality of write/read unit areas. If the nonvolatile memory is a NAND flash memory, the erase unit area corresponds to a physical block. The write/read unit areas correspond to physical pages of the physical block.

In the first embodiment, access means that data is stored in or written to a memory, or data is read from the memory.

FIG. 1 is a block diagram of the memory system according to the first embodiment.

An information processing system 1 includes an information processing device 2 and a memory system 3. In the first embodiment, the information processing device 2 operates as a host device of the memory system 3.

The memory system 3 may be located in the information processing device 2, or may be connected to the information processing device 2 through a network or the like so as to be communicable with the information processing device 2. The memory system 3 may be connected to a plurality of information processing devices 2 for communication therewith. Furthermore, a plurality of memory systems 3 may be connected to one or more information processing devices 2 for communication therewith.

In the first embodiment, an operation to write data that is received from the information processing device 2 and stored in a buffer memory 7, to any of the nonvolatile memories 101 to 10N will be referred to as host writing. The host writing is distinguished from, for example, compaction writing which is performed on the nonvolatile memories 101 to 10N during compaction.

Compaction is processing for collecting valid data stored in a plurality of memory areas into a memory area in order to increase areas to which writing can be performed. It should be noted that in the first embodiment, garbage collection may be performed instead of compaction. In the first embodiment, garbage collection is processing for clearing unnecessary data (including invalid data) from the memory areas. It should be noted that if the nonvolatile memories 101 to 10N are NAND flash memories, it is necessary to erase a physical block to clear the unnecessary data from the memory areas. Thus, valid data in the physical block that is subjected to the garbage collection is moved to another physical block. Therefore, when the nonvolatile memories 101 to 10N are NAND flash memories, both compaction and garbage collection are usually carried out.

Generally, valid data is data which is available to be accessed. In the first embodiment, valid data is data which is transferred, for example, when the garbage collection is performed on a given memory area, to another memory area.

On the other hand, invalid data is data other than the valid data, i.e., data which is not available to be accessed. In the first embodiment, invalid data includes data that does not need to be written to another memory area and may be erased, when the garbage collection is performed on a given memory area. Also, invalid data includes data for which an update has been performed, that is, old data that has been replaced by new data.

The following is a brief description of the memory system 3 according to the first embodiment.

The memory system 3 includes the buffer memory 7 as memory for temporarily storing write data. The buffer memory 7 includes buffer memories 7A and 7B. The maximum writable data amount of the buffer memory 7A is larger than that of the buffer memory 7B, and the processing speed of the buffer memory 7A is lower than that of the buffer memory 7B. That is, the buffer memory 7A has a larger capacity and a lower processing speed, and the buffer memory 7B has a smaller capacity and a higher processing speed.

On the basis of predetermined criteria, the memory system 3 determines (or estimates) the buffer-memory storage period of each write data to be written to the buffer memory 7. Then, the memory system 3 stores in the buffer memory 7A, write data that is determined to have a long buffer-memory storage period (for example, a buffer-memory storage period equal to or longer than a threshold value), and stores in the buffer memory 7B, write data that is each determined to have a short buffer-memory storage period (for example, a buffer-memory storage period shorter than the threshold value).

The predetermined criteria includes: (i) whether the write data is host write data associated with host writing or compaction write data associated with compaction writing; (ii) whether the write data is data to be written in a channel direction of the nonvolatile memories 101 to 10N or data to be written in a plane direction of the nonvolatile memories 101 to 10N; (iii) whether the write data is data to be written to a lower page of a NAND flash memory, which needs 2-bit upper programming, or data to be written to an upper page of the NAND flash memory; and combination of two or more of (i)-(iii).

Here, the lower page is a page including least significant bits (LSBs), and the upper page is a page including most significant bits (MSBs).

The following is a concrete structure of the memory system 3 according to the first embodiment. Here, writing to memory cells of the nonvolatile memories 101 to 10N may be referred to as programming.

The memory system 3 includes a controller 4 and the nonvolatile memories 101 to 10N. The controller 4 is connected to the nonvolatile memories 101 to 10N.

The controller 4 includes an interface unit 5, a storage unit 6, the buffer memory 7, a control unit 81, a command processor unit 82, an allocation unit 83, a selection unit 84, an address translation unit 85, a host write unit 86, a compaction write unit 87, a read unit 88, a system bus 89, and a memory control unit 9. The interface unit 5, the storage unit 6, the buffer memory 7, the control unit 81, the command processor unit 82, the allocation unit 83, the selection unit 84, the address translation unit 85, the host write unit 86, the compaction write unit 87, the read unit 88, and the memory control unit 9 are connected to the system bus 89. As a result, data, information, signals, commands (e.g., write commands, read commands, or erase commands), addresses, or the like can be transmitted between the above units.

The memory control unit 9 includes memory controllers 91 to 9N connected to the nonvolatile memories 101 to 10N, respectively, and an adjustment unit 9A.

The memory controllers 91 to 9N control the nonvolatile memories 101 to 10N, respectively, with respect to operations such as writing, reading, and erasure.

The adjustment unit 9A is connected to the memory controllers 91 to 9N, selects the memory controllers 91 to 9N to be accessed and adjusts timing to perform writing, reading, or erasing.

The interface unit 5 is connected to an external device such as the information processing device 2, such that they can communicate with each other to transmit data, information, signals, commands, addresses, or the like.

The storage unit 6 includes, for example, a setting register and a dynamic random access memory (DRAM). For example, the storage unit 6 stores in the setting register, various setting values received from the control unit 81.

Also, the storage unit 6 may store, in the DRAM, the address translation table 61 in which physical addresses and logical addresses of data are associated with each other. The address translation table 61 may be stored in another memory in the controller 4, which is not shown in FIG. 1, instead of the storage unit 6, and may be written to the nonvolatile memories 101 to 10N.

The buffer memory 7, as described above, includes the buffer memory 7A having a larger capacity and a lower processing speed and the buffer memory 7B having a smaller capacity and a higher processing speed.

The control unit 81 controls the memory system 3 as a whole. For example, in case of executing the compaction, the control unit 81 sends a compaction request to the command processor unit 82.

If the command processor unit 82 receives a host write command from the information processing device 2 through the interface unit 5, the command processor unit 82 sends the host write command to the allocation unit 83.

Also, if the command processor unit 82 receives the compaction request from the control unit 81, the command processor unit 82 produces a compaction (write/read) command, and sends the command to the allocation unit 83.

Furthermore, if the command processor unit 82 receives a read command from the information processing device 2 through the interface unit 5, the command processor unit 82 sends the read command to the read unit 88.

The allocation unit 83 allocates host write data associated with the host write command received from the command processor unit 82 or compaction write data associated with the compaction write command received from the command processor unit 82 to locations of a logical page. To be more specific, the allocation unit 83 determines which location of the logical page the write data should be located, and sends a result of this determination to the selection unit 84. The logical pages will be described in detail below with reference to FIGS. 2 and 3.

In the above allocation of the write data to the locations of the logical page, the allocation unit 83 determines whether the write data are to be arranged in a channel direction or a plane direction. For example, the allocation unit 83 allocates the compaction write data to a logical page in the plane direction thereof. Then, the allocation unit 83 sends the result of the determination along with a write command to the selection unit 84.

Also, the allocation unit 83 determines whether a presently handled logical page is a lower page or an upper page. Therefore, the allocation unit 83 determines whether write data allocated to a logical page is write data allocated to a lower page or write data allocated to an upper page. Then, the allocation unit 83 sends the result of the determination along with a host write command or a compaction write command to the selection unit 84.

The selection unit 84 designates to the interface unit 5 or the memory control unit 9 particular memory (the buffer memory 7A or the buffer memory 7B), as a storage destination, on the basis of the result of the determination sent from the allocation unit 83 and the criteria to determine the storage destination, which is set in the selection unit 84.

The criteria may be set such that in case of receiving a compaction write command, write data is stored in the buffer memory 7B, and in case of receiving a host write command, write data is stored in the buffer memory 7A.

Also, the criteria may be set such that write data to be written in the plane direction is stored in the buffer memory 7B, and write data to be written in the channel direction is stored in the buffer memory 7A.

Furthermore, the criteria may be set such that with respect to memory cells of the nonvolatile memories 101 to 10N, write data to be written to an upper page by 2-bit upper programming is stored in the buffer memory 7B, and write data to be written to a lower page by 2-bit upper programming is stored in the buffer memory 7A.

It should be noted that in the selection unit 84, another criteria relevant to the storage period of the write data may be set to determine the memory (the buffer memory 7A or the buffer memory 7B) as a storage destination.

Also, the criteria to determine the storage destination may be dynamically changed.

The interface unit 5 functions as a first unit which stores host write data, in the buffer memory 7A or the buffer memory 7B, in accordance with an instruction received from the selection unit 84.

The memory control unit 9 function as a second unit which reads compaction write data from the nonvolatile memories 101 to 10N, and stores the compaction write data in the buffer memory 7B, in accordance with an instruction received from the selection unit 84.

If the amount (write execution size) of host write data stored in the buffer memory 7A or the buffer memory 7B is adequate for writing to the nonvolatile memories 101 to 10N, the host write unit 86 writes data having a predetermined write size in the buffer memory 7A or the buffer memory 7B to the nonvolatile memories 101 to 10N through the memory control unit 9, in accordance with instructions by the allocation unit 83.

Further, in accordance with instructions by the allocation unit 83, the compaction write unit 87 executes, through the memory control unit 9, an erase operation on the nonvolatile memories 101 to 10N and also a writing operation of writing the compaction write data stored in the buffer memory 7B to the nonvolatile memories 101 to 10N.

The read unit 88 sends a logical address attached to the read command to the address translation unit 85, receives a physical address associated with the logical address from the address translation unit 85, reads data (read data) associated with the physical address from the nonvolatile memories 101 to 10N through the memory control unit 9, and temporarily stores the read data in the buffer memory 7. Furthermore, the read unit 88 rearrange the read data such that the read data are arranged in an order appropriate for the information processing device 2 to process (in the order of logical addresses which is specified by the information processing device 2). Also, the read unit 88 sends the read data, through the interface unit 5, to the information processing device 2, which has issued the read command.

The address translation unit 85 updates, when write data is stored in the buffer memory 7A or 7B, the address translation table 61 such that the logical address of the write data is associated with the physical address in the buffer memory 7A or 7B in which the write data is stored.

Also, the address translation unit 85 updates, when the write data in the buffer memory 7A or 7B is written to the nonvolatile memories 101 to 10N, the address translation table 61 such that logical address of the write data is associated with a physical address in the nonvolatile memories 101 to 10N in which the write data is written.

Furthermore, the address translation unit 85 updates, when data in the nonvolatile memories 101 to 10N is moved through the compaction, the address translation table 61 such that logical address of the moved data is associated with a physical address to which the data is moved through the compaction.

In addition, the address translation unit 85 translates, in case of receiving a logical address associated with the read command from the read unit 88, the logical address into a physical address, referring to the address translation table 61, and sends the physical address to the read unit 88.

Here, some or all of the control unit 81, the command processor unit 82, the allocation unit 83, the selection unit 84, the address translation unit 85, the host write unit 86, the compaction write unit 87, and the read unit 88 may be provided as hardware or software. For example, the functions of the control unit 81, the command processor unit 82, the allocation unit 83, the selection unit 84, the address translation unit 85, the host write unit 86, the compaction write unit 87, and the read unit 88 may be achieved by a processor of the memory system 3 executing a program stored in or written to any of the storage unit 6 and the nonvolatile memories 101 to 10N.

Concrete examples of first to third determination methods of determining the storage destination will be described. In the first embodiment, the first to third determination methods can be arbitrarily combined.

In the first determination method, the storage destination is determined based on whether write data is host write data or compaction write data. When the memory system 3 performs writing in a write-one-read-many manner, garbage collection of invalid data accumulated by rewriting write data corresponds to compaction. As described above, when compaction is performed, valid data in the nonvolatile memories 101 to 10N is read, and stored in the buffer memory 7B in the controller 4. Then, the valid data in the buffer memory 7B is written to another memory cell in the nonvolatile memories 101 to 10N. Compaction can be efficiently carried out by performing reading and writing in a large unit. Thus, compaction write data are collected in the buffer memory 7B in a shorter period, and written to the nonvolatile memories 101 to 10N.

Therefore, in the first determination method, it is determined that the buffer-memory storage period of the compaction write data is shorter than that of the host write data, and the selection unit 84 selects the buffer memory 7B having a higher processing speed, as a memory to which the compaction write data is to be written.

In the second determination method, the storage destination is determined based on whether writing is performed in the channel direction of logical pages or in the plane direction thereof.

FIG. 2 is a conceptual diagram of a logical page.

Logical page $LP_0$ includes 8 channels and 4 planes as a structure.

In logical page $LP_0$, four planes $PL_0$ to $PL_3$ are arranged in the plane direction (first direction), and 8 channels $CH_0$ to $CH_7$ are arranged in the channel direction (second direction).

Also, in logical page $LP_0$, in each of areas partitioned by four planes $PL_0$ to $PL_3$ and 8 channels $CH_0$ to $CH_7$, four clusters are included. A cluster CL is a minimum management unit in the nonvolatile memories 101 to 10N.

FIG. 3 is a conceptual diagram of a logical block.

The memory system 3 controls, using a plurality of logical blocks, allocation of data to the nonvolatile memories 101 to 10N. To be more specific, the memory system 3 allocates write data to be written to the nonvolatile memories 101 to 10N to at least one of a plurality of data management units included in a plurality of logical blocks associated with the nonvolatile memories 101 to 10N. In a logical block, a plurality of logical pages is stacked. Each of the logical pages includes a plurality of data management units arranged in a matrix in the channel direction and the plane direction. Data arranged in the plane direction can be written to the nonvolatile memories 101 to 10N at the same time. FIG. 3 representatively shows logical block $LB_0$, as one of a plurality of logical blocks of the nonvolatile memories 101 to 10N. The other logical blocks are the same as the logical block $LB_0$. Also, FIG. 3 mainly shows logical page $LP_0$ of logical pages $LP_0$ to $LP_M$ included in logical block $LB_0$. The other logical pages, i.e., logical pages $LP_1$ to $LP_M$ are the same as logical page $LP_0$.

The controller 4 of the memory system 3 manages the logical blocks, logical pages, planes, channels, and clusters, using logical block identification information, logical page identification information, plane identification information, channel identification information, and cluster identification information.

Logical block $LB_0$ includes four planes $PL_0$ to $PL_3$, eight channels $CH_0$ to $CH_7$, and M logical pages $LP_0$ to $LP_M$. In logical block $LB_0$, four planes $PL_0$ to $PL_3$ are arranged in the plane direction, eight channels $CH_0$ to $CH_7$ are arranged in the channel direction, and M logical pages $LP_0$ to $LP_M$ are arranged in a page stacking direction.

In logical page $LP_0$, for example, four planes $PL_0$ to $PL3$ associated with channel $CH_0$, i.e., the same channel, can be accessed at the same time, and corresponds to a single physical page PP.

A group of M physical pages PP stacked together in the page stacking direction corresponds to a physical block PB.

In other words, logical block LB0 includes eight physical blocks PB arranged in the channel direction. Each of the physical blocks PB includes M physical pages PP arranged in the page stacking direction.

Lower pages and upper pages will be described with reference to physical block $PB_7$ associated with channel $CH_7$, which is one of eight physical blocks PB. The physical blocks PB other than physical block PB7 are the same as the physical block PB7.

In physical block $PB_7$, lower pages $PP_0$, $PP_2$, . . . , and $PP_{M-1}$, and upper pages $PP_1$, $PP_3$, . . . , and $PP_M$ are alternately arranged.

For example, in lower/upper programming on physical pages $PP_0$ to $PP_M$ of physical block $PB_7$, lower page $PP_0$, lower page $PP_2$, upper page $PP_1$, lower page $PP_4$, upper page $PP_3$, . . . , and upper page $PP_M$ are subjected to writing in this order. The lower/upper programming will be described below with reference to FIG. 4.

The nonvolatile memory 101 includes physical blocks PB associated with channels $CH_0$ of a plurality of logical blocks. Also, the nonvolatile memory 102 includes physical blocks PB associated with channels CH1 of the logical blocks. The same is true of the other nonvolatile memories 103 to 108.

In the first embodiment, in the nonvolatile memories 101 to 10N, write data associated with four planes $PL_0$ to $PL_3$ of a single physical page can be written at the same time (tPROG) (multi-plane program). Thus, the controller 4 stores write data associated with four planes $PL_0$ to $PL_3$ arranged in a row in the plane direction of the logical pages in the buffer memory 7B, and then writes the write data of the single row in the plane direction to the nonvolatile memories 101 to 10N, thereby achieving efficient writing. The buffer-memory storage period of the write data can be shortened by writing the write data in the plane direction of the logical pages.

On the other hand, when the write data is written in the channel direction of the logical pages, the nonvolatile memories 101 to 108 associated with channels $CH_0$ to $CH_7$ are subjected to reading in parallel with each other, thus improving a sequential reading function. However, when the write data is written in the channel direction of the logical pages, it takes time to write data corresponding to four planes $PL_0$ to $PL_3$ to each of the channels $CH_0$ to $CH_7$, and thus the buffer-memory storage period of the write data is long.

Therefore, in the second determination method, when the write data are written in the plane direction of the logical pages, it is determined that the buffer-memory storage period is short and therefore that the buffer memory 7B is the storage destination, and when the write data are written in the channel direction of the logical pages, it is determined that the buffer-memory storage period is long and therefore that the buffer memory 7A is the storage destination.

In the third determination method, the storage destination is determined based on whether the way of writing the write data is lower/upper programming or 2-bit upper programming and whether the write data is written to a lower page or an upper page.

FIG. 4 is a timing chart showing an example of the lower/upper programming.

Writing in the nonvolatile memories 101 to 10N needs data-in time during which the write data is input to the nonvolatile memories 101 to 10N and tPROG time during which the write data is actually written to a memory cell array included of the nonvolatile memories 101 to 10N.

If the nonvolatile memories 101 to 10N are multi-level-cell (MLC) NAND flash memories, two-bit data can be written to a single memory cell.

In the lower/upper programming, first, one bit of LSB (expressed as "lower") is input to the nonvolatile memories 101 to 10N (data-in), and written to a memory cell of the nonvolatile memories 101 to 10N (program). Next, one bit of MSB (expressed as "upper") is input to the nonvolatile memories 101 to 10N (data-in), and written to the memory cell of the nonvolatile memories 101 to 10N (program). Thereby, two-bit data is written to a single memory cell.

In the lower/upper programming, in order to perform writing in upper page U[k] corresponding to a $k^{th}$ page, it is necessary that writing of lower page L[K−1] corresponding to a k−$1^{th}$ page and lower page L[K+1] corresponding to a k+$1^{th}$ page is completed in advance.

FIG. 5 is a timing chart showing an example of the 2-bit upper programming.

The 2-bit upper programming is a writing method which, needs data-in for a lower page associated with an upper page at the program time for the upper page, in addition to the writing method of the above lower/upper programming shown in FIG. 4.

For example, writing of upper page U[K−1] corresponding to a k−1$^{th}$ page needs data-in for lower page L[k−1] corresponding to the k−1$^{th}$ page. Similarly, writing of upper page U[K] corresponding to a k$^{th}$ page needs data-in for lower page L[k] corresponding to the k$^{th}$ page. Thus, in the two-bit upper programming, data for a lower page is stored in the buffer memory 7 in the controller 4 for a longer period of time than data for an upper page.

Therefore, in the third determination method, when the write method is the 2-bit upper programming and the write data is written to a lower page, it is determined that the buffer-memory storage period is long and therefore that the storage destination is the buffer memory 7A.

FIG. 6 is a flowchart showing an example of data storage processing to the buffer memory 7 by the memory system 3 according to the first embodiment.

In step 601, the allocation unit 83 allocates the write data to a logical page.

In step 602, the selection unit 84 determines whether or not the write data is compaction write data.

If the write data is compaction write data (Yes in 602), the process proceeds to step 605.

If the write data is not compaction write data (No in 602), in step 603, the selection unit 84 determines whether or not the write data is allocated in the plane direction of the logical pages.

If the write data is allocated in the plane direction (Yes in 603), the process proceeds to step 605.

If the write data is not allocated in the plane direction (No in 603), in step 604, the selection unit 84 determines whether or not the write data is data to be written to a lower page in the 2-bit upper programming.

If the write data is not data to be written to a lower page by the 2-bit upper programming (No in 604), the process proceeds to step 605.

If the write data is data to be written to a lower page by the 2-bit upper programming (Yes in 604), the process proceeds to step 606.

In step 605, the selection unit 84 selects the buffer memory 7B having a higher processing speed, if the write data is compaction write data (Yes in 602), if it is data allocated in the plane direction (Yes in 603), or if it is not data to be written to a lower page by the 2-bit upper programming (No in 604).

In step 606, the selection unit 84 selects the buffer memory 7A having a lower processing speed, if write data is host write data (No in 602), the write data are allocated in the channel direction (No in 603), and the write data are to be written to a lower page by the 2-bit upper programming (Yes in 604).

In step 607, the interface unit 5 stores the host write data in one of the selected buffer memory 7A or 7B, or the memory control unit 9 stores the compaction write data in the selected buffer memory 7A.

In step 608, the address translation unit 85 updates the address translation table 61 such that the logical address of the write data is associated with a physical address in the buffer memory 7.

In the first embodiment as described above, for example, the buffer memory 7A having a lower processing speed or the buffer memory 7B having a higher processing speed is selected based on, for example, whether the write data is host write data or compaction write data, or whether the write data are to be written in the channel direction or in the plane direction, or whether the write data are to be written to an upper page by the 2-bit upper programming or a lower page by the 2-bit upper programming.

According to the first embodiment, the operation rate of the buffer memory 7 can be improved, the size of the buffer memory 7 that is required to carry out data writing at a preferred performance level can be reduced, and the write latency of the memory system 3 can be improved.

Second Embodiment

A second embodiment, as a modification of the first embodiment, will be described.

Figure 7:
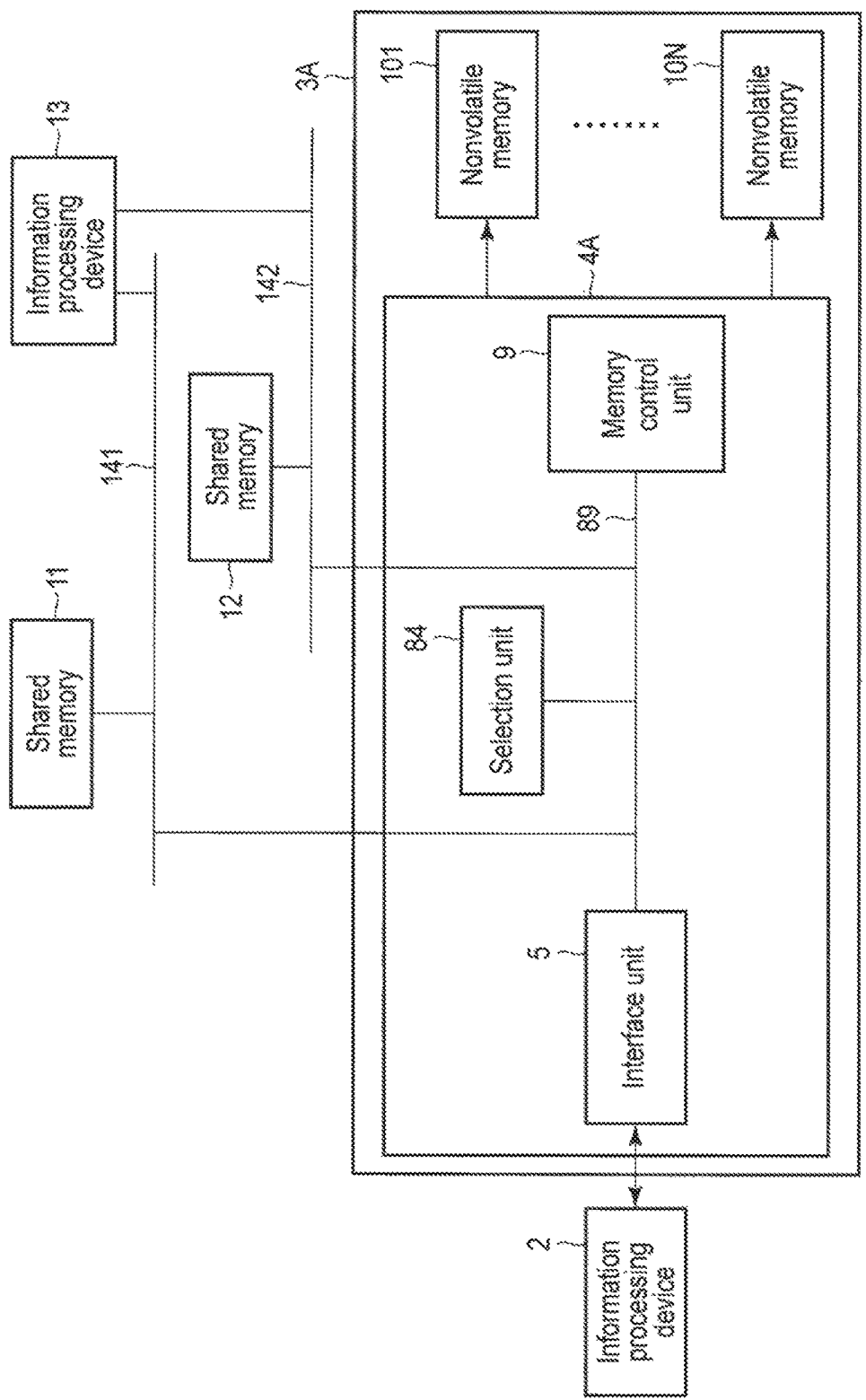
FIG. 7 is a block diagram of a memory system according to a second embodiment.

FIG. 7 is a block diagram of an information processing system including a memory system 3A according to the second embodiment.

The controller 4A of the memory system 3A has the same function as the controller 4 in the first embodiment; however, except for an interface unit 5, a selection unit 84, and a memory control unit 9, its structural elements are omitted in FIG. 7.

The memory system 3A can access shared memory 11 through a shared bus 141. Also, the memory system 3A can access shared memory 12 through a shared bus 142.

Similarly, an information processing device 13 can access the shared memory 11 through the shared bus 141. Also, the information processing device 13 can access the shared memory 12 through the shared bus 142.

In the second embodiment, for clarification, it is assumed that the shared memories 11 and 12 and the shared buses 141 and 142 are shared among the memory system 3A and the information processing device 13; however, they may be accessible by another memory or another information processing device.

The memory system 3A and the information processing device 13 can access the shared memories 11 and 12, and thus can transmit and receive data therebetween through the shared memories 11 and 12.

Furthermore, since the memory system 3A and the information processing device 13 share the shared memories 11 and 12, it is possible to prevent increase of replicated data and use of further memory or memories, and also prevent redundancy of management of data and a system configuration.

In the second embodiment, a latency caused when the memory system 3A accesses the shared memory 11 through the shared bus 141 is different from that caused when the memory system 3A accesses the shared memory 12 through the shared bus 142.

In the second embodiment, the memory system 3A selects the shared memory 11 or 12 as a data storage destination based on the latencies. However, instead of the latencies, the memory system 3A may select the shared memory 11 or 12 as the data storage destination based on throughput (the amount of data which can be processed per unit time) when the memory system 3A accesses the shared memory 11 through the shared bus 141 and throughput when the memory system 3A accesses the shared memory 12 through the shared bus 142. Furthermore, the memory system 3A may select the shared memory 11 or 12 based on both the latencies and the throughputs. For example, the throughput of the shared memory 11 is lower than that of the shared memory 12.

For example, the smaller the numbers of the times the memory system 3A and the information processing device 13 access the shared memories 11 and 12, the shorter the latencies of the shared memories 11 and 12.

Also, the lower the frequencies of accesses (for example, the numbers of accesses per unit time) of the memory system 3A and the information processing device 13 to the shared memories 11 and 12 are, the shorter the latencies of the shared memories 11 and 12 are.

For example, the greater the bandwidths of the shared buses 141 and 142 connected the shared memories 11 and 12 are, the shorter the latencies of the shared memories 11 and 12 are.

The higher the processing frequencies of the shared memories 11 and 12 are, the shorter the latencies of the shared memories 11 and 12 are.

The higher the frequencies used in the shared buses 141 and 142 are, the shorter the latencies of the shared memories 11 and 12 are.

In the second embodiment, it is assumed that with respect to the memory system 3A, the latency of the shared memory 11 is longer than that of the shared memory 12, that is, the shared memory 11 has a lower processing speed than the shared memory 12. To be more specific, it is assumed that the time required for accessing the shared memory 11 is longer than that for accessing the shared memory 12 for the reasons that, for example, the number or frequency of accesses to the shared memory 11 is larger or higher, the bandwidth of the bus 141 connected to the shared memory 11 is smaller, and/or the clock frequency of the shared memory 11 or the shared bus 141 is lower. For example, the shared memory 11 may be a DRAM, and the shared memory 12 may be a static random access memory (SRAM), respectively.

In the present embodiment, a selection unit 84 designates an interface unit 5 or a memory control unit 9 one of the shared memories 11 and 12 as a storage destination. For example, the selection unit 84 issues an instruction to store data determined to have a longer storage period in the shared memory 11, and also an instruction to store data determined to have a shorter storage period in the shared memory 12. The selection unit 84 may store a latency associated with the shared memory 11 and that associated with the shared memory 12 in advance. A storage unit corresponding to the interface unit 5 or the memory control unit 9 stores data determined to have a longer storage period in the shared memory 11 or data determined to have a shorter storage period in the shared memory 12.

According to the second embodiment, it is possible to improve the operation rates of the shared memories 11 and 12, reduce the sizes of the shared memories 11 and 12, and improve the write latency of the memory system 3A.

In the second embodiment, the latencies and/or throughputs of the shared memories 11 and 12 may be monitored to determine one of the shared memory 11 and the shared memory 12 to be the storage destination. When the access states of the shared memory 11 and the shared memory 12 are dynamically changed, data can be appropriately stored.

Third Embodiment

FIG. 8 is a block diagram of an information processing system including a memory system 3A according to a third embodiment.

Referring to FIG. 8, memory 15 is provided in the controller 4A, instead of the shared memory 12 according to the second embodiment, and the shared bus 142 shown in FIG. 7 is not provided. Referring to FIG. 8, for example, the shared memory 11 may be a DRAM and the memory 15 may be a SRAM, respectively.

Since the shared memory 11 can be also accessed from the information processing device 13, the number of access times tends to be larger and the access frequency tends to be higher than those of the memory 15.

In addition, the data transfer speed of the shared bus 141 may be lower than the system bus 89 in the controller 4A.

In such a case, the latency of the shared memory 11 is longer than that of the memory 15, that is, the shared memory 11 has a lower processing speed than the memory 15.

In view of the features of the memories 11 and 14, according to the present embodiment, the selection unit 84 issues an instruction to store data determined to have a longer storage period in the shared memory 11, and also an instruction to store data determined to have a shorter storage period in the memory 15. Then, the storage unit corresponding to the interface unit 5 or the memory control unit 9 stores data determined to have a longer storage period in the shared memory 11, and data determined to have a shorter storage period in the memory 15. According to the second embodiment, the write latency of the memory system 3A can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system, comprising:
a first buffer memory;
a second buffer memory having a higher memory performance rating than the first buffer memory;
a nonvolatile semiconductor memory including an array of memory cell regions; and
a controller configured to cause data to be buffered in one of the first and second buffer memories before the data are transferred to the nonvolatile semiconductor memory, according to characteristics of the data, wherein
the memory cell regions are arranged in a first direction and a second direction, the memory cell regions that are aligned along the first direction being writable through a single write operation, and the memory cell regions that are aligned along the second direction not being writable through a single write operation, and
when the data are to be written in the memory cell regions that are aligned in the first direction, the controller causes the data to be buffered in the second buffer memory, and when data are to be written in the memory cell regions that are aligned in the second direction, the controller causes the data to be buffered in the first buffer memory.

2. The memory system according to claim 1, wherein each of the memory cell regions includes a plurality of multi-level memory cells, and
when data are to be written in a lower page of the memory cell regions, the controller causes the data to be buffered in the first buffer memory, and
when data are to be written in an upper page of the memory cell regions, the controller causes the data to be buffered in the second buffer memory.

3. The memory system according to claim 2, wherein data are written in the nonvolatile semiconductor memory employing two-bit upper programing.

4. The memory system according to claim 1, wherein the controller causes the data to be buffered in the second buffer memory when the data to be buffered and written are compaction data.

5. The memory system according to claim 4, wherein the controller causes the compaction data to be written in memory cell regions that are aligned along the first direction.

6. The memory system according to claim 1, wherein at least one of the first and second buffer memories are shared with an external device.

7. The memory system according to claim 6, wherein the first buffer memory is shared with the external device, and the second buffer memory is not.

8. The memory system according to claim 1, wherein the memory performance rating relates to one of processing speed, latency, and throughput, and the first buffer memory has a larger capacity than the second buffer memory.

9. A memory system, comprising:
a first buffer memory;
a second buffer memory having a higher memory performance rating than the first buffer memory;
a nonvolatile semiconductor memory including an array of memory cell regions, each of the memory cell regions including a plurality of multi-level memory cells; and
a controller configured to cause data to be buffered in at least one of the first and second buffer memories before the data are transferred to the nonvolatile semiconductor memory, wherein
when data are to be written in a lower page of the memory cell regions, the controller causes the data to be buffered in the first buffer memory, and
when data are to be written in an upper page of the memory cell regions, the controller causes the data to be buffered in the second buffer memory.

10. The memory system according to claim 9, wherein data are written in the nonvolatile semiconductor memory employing two-bit upper programing.

11. The memory system according to claim 9, wherein the controller causes the data to be buffered in the second buffer memory when the data to be buffered and written are compaction data.

12. The memory system according to claim 9, wherein at least one of the first and second buffer memories are shared with an external device.

13. The memory system according to claim 12, wherein the first buffer memory is shared with the external device, and the second buffer memory is not.

14. The memory system according to claim 9, wherein the memory performance rating relates to one of processing speed, latency, and throughput, and the first buffer memory has a larger capacity than the second buffer memory.

* * * * *